United States Patent [19]

Bianchi et al.

[11] Patent Number: 4,852,662

[45] Date of Patent: Aug. 1, 1989

[54] IMPACTING MECHANISM

[75] Inventors: Raymond A. Bianchi, Pekin, Ill.; David Kistner, Huber Heights, Ohio; Joseph Oswald, Hopedale; Elmer B. Phelps, Creve Coeru, both of Ill.

[73] Assignee: Caterpillar Inc., Peoria, Ill.

[21] Appl. No.: 173,899

[22] Filed: Mar. 28, 1988

[51] Int. Cl.[4] .............................................. B23B 45/16
[52] U.S. Cl. ...................................... 173/119; 173/13
[58] Field of Search .................. 173/119, 13, 122, 125

[56] References Cited

U.S. PATENT DOCUMENTS 3,319,724 5/1967 Cunningham ....................... 173/119
3,358,779 12/1967 Cunningham ....................... 173/119

FOREIGN PATENT DOCUMENTS

WO87/05064 8/1987 PCT Int'l Appl. .

*Primary Examiner*—Frank T. Yost
*Assistant Examiner*—Willmon Fridie, Jr.
*Attorney, Agent, or Firm*—Calvin E. Glastetter

[57] ABSTRACT

An impacting mechanism for impacting a surface. An impacting mechanism having plungers spaced apart and adjacent allows fractured pieces to fly away and has a latch assembly that puts side loads on the plungers. An impacting mechanism having an impact plunger disposed in generally centered relation within a tubular actuator shields the impact to contain fractured pieces and provides a plurality of latch assemblies to equalize loading. The impacting mechanism breaks composite material into a plurality of pieces.

25 Claims, 4 Drawing Sheets

Fig. 6
Fig. 4
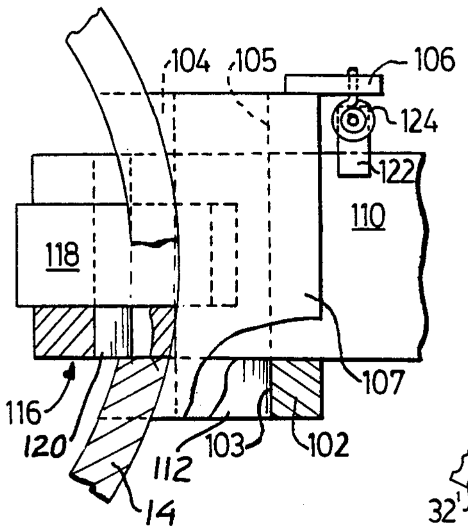
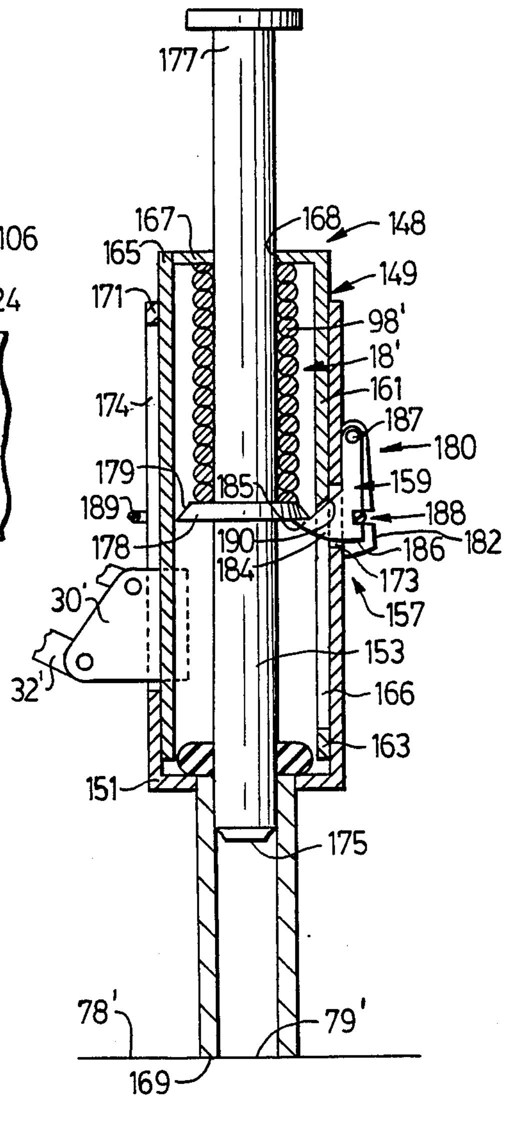

IMPACTING MECHANISM

TECHNICAL FIELD

This invention relates to a mechanical impacting mechanism used to impact a surface and more particularly to an impacting mechanism for breaking composite material into a plurality of pieces.

BACKGROUND ART

A known demolition apparatus has a housing which is attached to a boom. The actuator plunger is mounted within the housing for axial movement with respect to the housing. The power plunger is mounted within the housing in adjacent spaced relation to the actuator plunger for movement with respect to the housing and the actuator plunger. The demolition apparatus has a latch which releasably connects the actuator plunger to a fixed collar on the power plunger. A problem associated with such demolition apparatus which has the actuator plunger and the power plunger in spaced relation is that fragments of the impacted material will be thrown outwardly from the impact of the power plunger against the surface. Another problem associated with such demolition apparatus is having a single latch which puts side loads on the actuator plunger and the power plunger, thus causing bending and wear on the plungers.

The present invention is directed to overcoming one or more of the problems as set forth above.

DISCLOSURE OF THE INVENTION

In one aspect of the present invention an impacting mechanism is adapted to be mounted on a movable manipulator for movement relative to a surface to be impacted. A guide structure is adapted to be connected to the manipulator. An actuator is movably supported by the guide structure and has an end portion adapted to contact the surface to be impacted. An impact plunger is movably supported relative to the guide structure and the actuator in generally centered relation within the actuator. Resilient means between the guide structure and the impact plunger biases the impact plunger toward the end surface of the actuator. A means releasably couples the actuator and the impact plunger so the resilient means is compressed in response to the guide structure being moved toward the end surface of the actuator. A means releases the coupling means when the guide structure reaches a predetermined distance from the end surface of the actuator so that the resilient means drives the impact plunger toward the surface to be impacted.

An impacting mechanism having an impact plunger which is disposed in a generally centered relation within the tubular actuator shields the impact to contain any fractured pieces of material and provides a plurality of latch assemblies to equalize loading on the impact plunger and the tubular actuator.

BRIEF DESCRIPTION OF THE DRAWINGS

FIG. 4 is an enlarged view of one latch assembly.

FIG. 6 is a diagrammatic sectional view showing an alternate design.

BEST MODE FOR CARRYING OUT THE INVENTION

Figure 1:
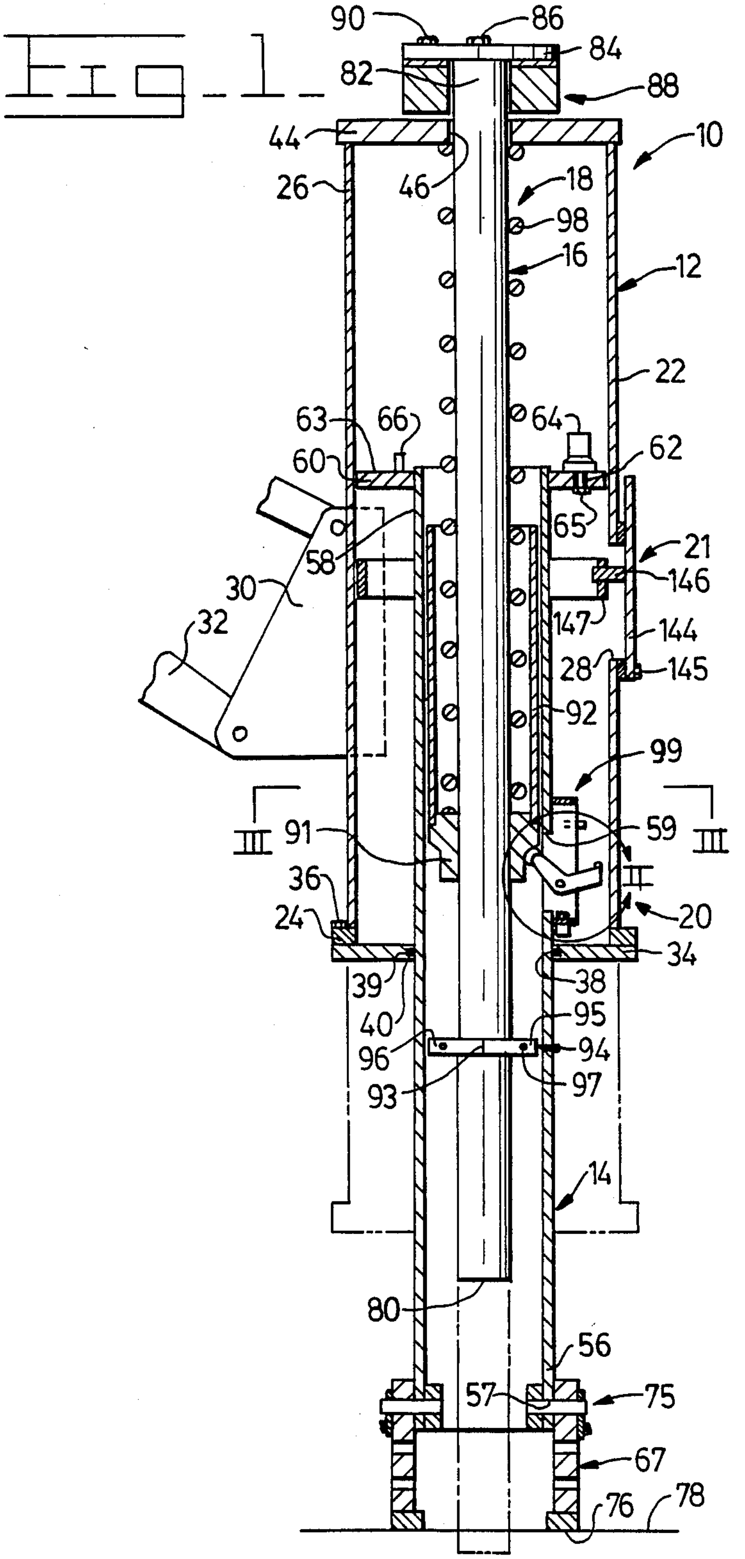
FIG. 1 a sectional view showing the internal elements of an embodiment of the present invention.

As shown in FIG. 1 of the drawings, an impacting mechanism 10 includes a guide structure 12, an elongate tubular actuator 14, an impact plunger 16, a resilient means 18, a releasable coupling means 20, and a releasing means 21.

The guide structure 12 includes a cylindrical housing 22 having a first end portion 24, and a second end portion 26, and a plurality of circumferentially equally spaced apertures, one of which is shown at 28, intermediate the end portions 24,26. A bracket 30 of suitable construction is fixedly attached to the cylindrical housing 22 and connects the cylindrical housing to a movable manipulator 32, such as a boom or suitable linkage of an industrial vehicle.

A first end plate 34 is releasably attached to the first end portion 24 of the cylindrical housing 22 by a plurality of fasteners, such as bolts 36. The end plate 34 has a bore 38 with a counterbore 39. A bearing 40 is positioned in the counterbore 39 of the end plate 34.

A second end plate 44 is suitably fastened to the second end portion 26 of the cylindrical housing 22 and has an aperture 46 therethrough.

The tubular actuator 14 is coaxially telescopically disposed within the guide structure 12 and is movably supported by the bearing 40 within the first end plate 34 thereof. The tubular actuator 14 includes a first end portion 56 with a pair of circumferentially equally spaced mounting holes 57, a second end portion 58, and a plurality of circumferentially equally spaced apertures, one of which is shown at 59, intermediate the first and second end portions 56,58. An annular guide 60 having an aperture 62 and an upper surface 63 is attached to the second end portion 58 of the tubular actuator 14. A resilient bumper 64 is releasably secured on the upper surface 63 of the guide 60 by a bolt 65 passing through the aperture 62. A plurality of stop rods 66 is attached to the upper surface 63 of the guide assembly 60.

Figure 5:
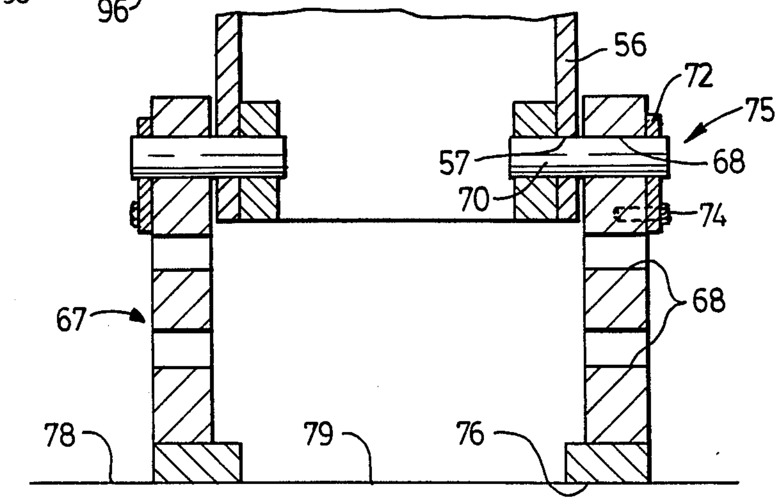
FIG. 5 is an sectional view showing the adjustable end of the actuator.

As best shown in FIG. 5, the tubular actuator 14 includes an adjustable collar 67 attached to the first end portion 56 thereof and having a plurality of vertically spaced pairs of adjusting apertures 68. A pair of pins 70, each having an anchor plate 72 secured to one end thereof is positioned in the uppermost pair of one of the adjusting apertures 68 and the pair of mounting holes 57 in the first end portion 56 of the tubular actuator 14 to releasably secure the adjusting collar 67 thereto. A bolt 74 releasably secures each of the anchor plates 72 to the adjustable collar 67 to retain the pins. The adjustable collar 67 has an end surface 76 adapted to contact a surface 78 which is to be impacted and defines an impact area 79 within adjustable collar 67. The adjustable collar 67, adjusting apertures 68, pins 70, and bolts 74 provide a means 75 to adjust the end surface 76 relative to the guide structure 12.

The impact plunger 16 is telescopically disposed in generally centered or coaxial relation within the tubular actuator 14. The impact plunger 16 has an end surface 80 adapted to impact the surface 78, and an oppositely disposed end portion 82 extending through the aperture 46 of the second end plate 44 of the guide structure 12.

A plate 84 is secured to the second end portion 82 of the impact plunger 16 by a plurality of bolts 86. An annular resilient bumper assembly 88 is attached to the plate 84 by a plurality of bolts 90 in downwardly extending relation as pictured in FIG. 1 toward the end plate 44. Alternatively, the bumper assembly 88 may be attached to the second end plate 44, or the bumper assembly 88 may loosely encircle the impact plunger 16 and rest on the second end plate 44. A spring abutment collar 91 is fixedly attached to the impact plunger 16 intermediate the first and second end portions 80,82. A tube 92 attached to the collar 91 extends upwardly to enclose and position the resilient means 18. A groove 93 is provided intermediate the collar 91 and the end surface 80 of the impact plunger 16. An annular guide ring 94 is removably attached in the groove 93 of the impact plunger 16. The guide ring 94 induces a first semicircular member 95 and a second semicircular member 96 encircling the impact plunger 16 and disposed in the groove 93 and is maintained in position by bolts, one of which is shown at 97.

The resilient means 18, in this specific embodiment a coil spring 98, encircles the impact plunger 16 and is positioned between and confined by the collar 91 of the impact plunger 16 and the second end plate 44 of the guide structure 12.

Figure 2:
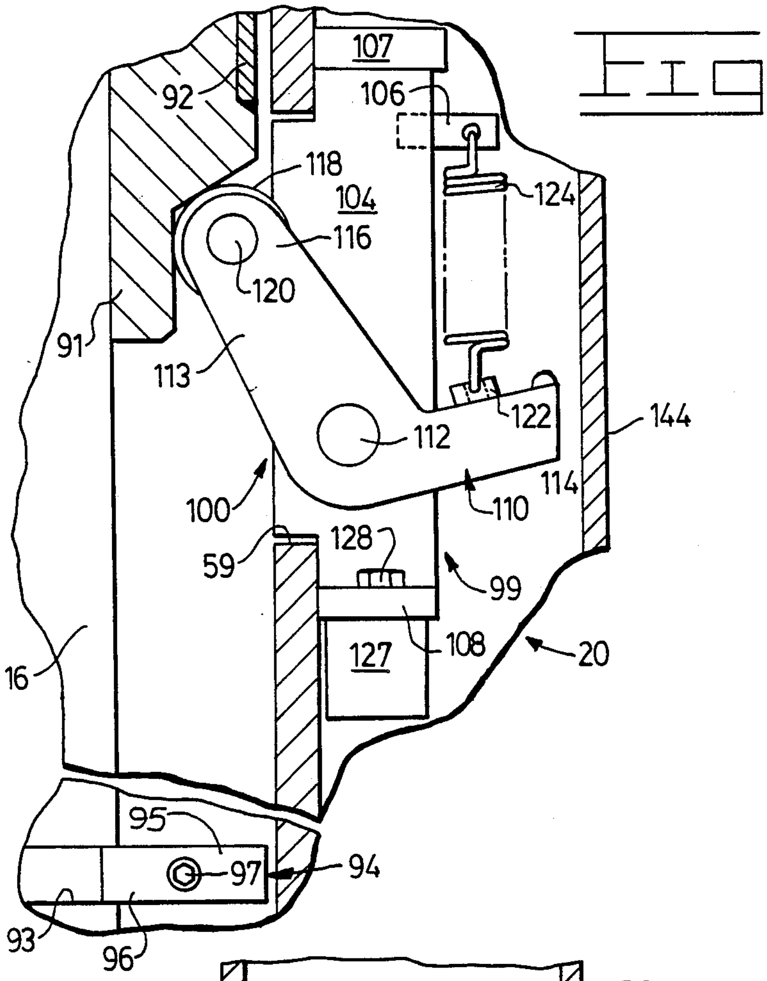
FIG. 2 is an enlarged view of a latch assembly as indicated by line II in FIG. 1.
Figure 3:
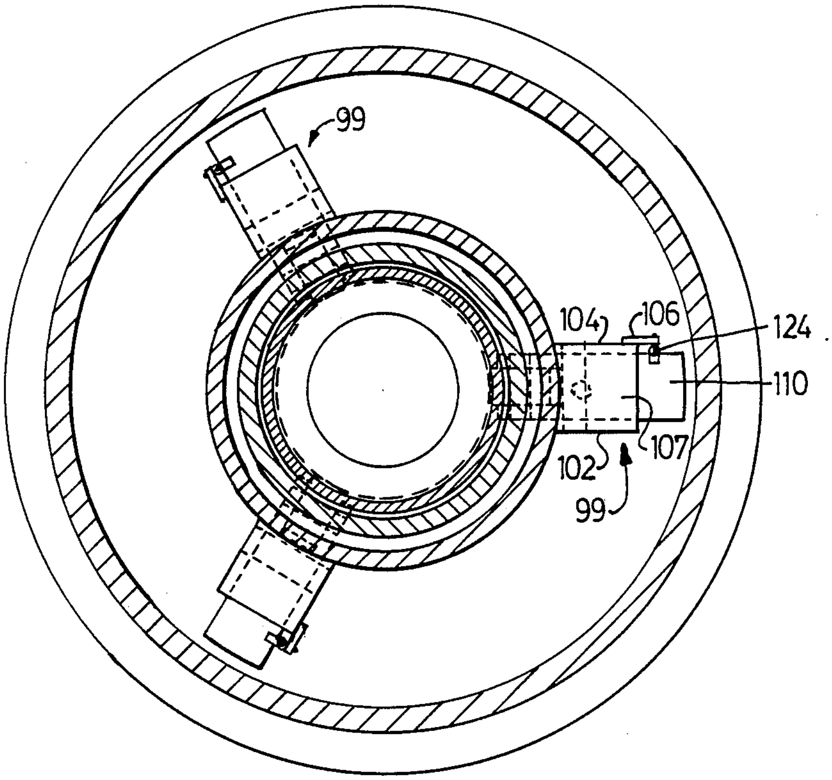
FIG. 3 is a sectional view taken along line III—III of FIG. 1.

As best shown in FIGS. 2, 3, and 4, the releasable coupling means 20 includes a plurality of circumferentially equally spaced latch assemblies 99 connected to the tubular actuator 14.

Each of the latch assemblies 99 includes a mounting assembly 100 having a first side plate 102, with an aperture 103, and a second side plate 104, with an aperture 105 and a tang 106. The side plates 102,104 are spaced apart and secured in one of the apertures 59 of the tubular actuator 14. An upper plate 107 is secured to the side plates 102 and 104. A lower plate 108 is also secured to the side plates 102 and 104. A bellcrank 110 is pivotally attached between the plates 102 and 104 by a pin 112 positioned in the apertures 103,105 of the side plates 102,104. The bellcrank 110 has an inwardly projecting first arm portion 113 and an outwardly projecting second arm portion 114. The first arm portion 113 has a bifurcated end portion 116. A roller 118 is positioned within the bifurcated end portion 116 and rotatably connected thereto by a pin 120. A lug 122 is secured to the second arm portion 114 of the bellcrank 110. A spring 124 is connected between the lug 122 of the second arm portion 114 of the bellcrank 110 and the lug 106 of the side plate 102. A resilient bumper 127 is attached under the lower plate 108 by a bolt 128.

The releasing means 21 includes a plurality of circumferentially equally spaced plates, one of which is shown at 144, suitably attached to the cylindrical housing 11 by a plurality of fasteners, one of which is shown at 145. Each plate 144 has an abutment member 146 which extends through the aperture 28 into the cylindrical housing 22 a predetermined distance. An annular trip ring 147 is suitably attached to the abutment members in alignment to engage the second arms 114 of the bellcrank.

In FIG. 6 an impacting mechanism 148 of an alternate design is shown. Elements which are the same in both embodiments will be described with a reference having a prime. The impacting mechanism 148 includes a guide structure 149, an elongate tubular actuator 151, an impact plunger 153, a resilient means 18', a releasable coupling means 157, and a releasing means 159.

The guide structure 149 includes a cylindrical housing 161 having a first end portion 163, and a second end portion 165, and a plurality of circumferentially equally spaced elongate vertical slots 166 intermediate the end portions 163,165. An end plate 167 is suitably attached to the second end portion 165 of the cylindrical housing 161. The end plate 167 has a hole 168. A bracket 30 of suitable construction is fixedly attached to the housing 161 and connects the housing 161 to a movable manipulator 32'.

The tubular actuator 151 is telescopically disposed in generally centered and coaxial relation with the guide structure 149. The tubular actuator 151 has an end surface 169 adapted to contact a surface 78' which is to be impacted, an oppositely disposed end portion 171, and a plurality of circumferentially equally spaced elongate vertical slots, one of which is shown at 173, are positioned intermediate the end surface 169 and the end portion 171 in alignment with the slots 168 in the guide structure 149. The end surface 169 defines an impact area 79' within the tubular actuator. A second elongate vertical slot 174 is positioned intermediate the end surface 169 and end portion 171 allowing for relative movement of the bracket 30' and the tubular actuator.

The impact plunger 153 is telescopically disposed in generally centered or coaxial relation with the tubular actuator 151. The impact plunger 153 has an end surface 175 adapted to impact the surface 78' and end portion 177 extending upwardly through the hole 167 of the end plate 166. A collar 178 is fixedly attached to the impact plunger intermediate the end surface 175 and the end portion 177. The collar 178 has an upwardly inward inclined surface 179.

The resilient means 18', in this specific embodiment a coil spring 98', encircles the impact plunger 153 and is positioned between the collar 178 of the impact plunger 153 and the end plate 166 of the guide structure 149.

The releasable coupling means 157 includes a plurality of circumferentially equally spaced latch assemblies, one of which is shown at 180, connected to the tubular actuator 151.

Each of the latch assemblies 180 includes a bracket 182 suitably attached to the tubular actuator 151. A latching lever 184 has a hook portion 185 with a lower curvilinear surface 186 extending through the slots 173 and 168 to the interior of the guide structure 149 and is pivotally attached to the bracket 182 by a pin 187. A resilient means 188, in this specific embodiment an elastomeric ring 189, biases the latching levers 184 inward selectively to engage the collar 178 on the impact plunger 153.

The releasing means 159 includes an abutment surface 190 formed by the slots 168 in the guide structure 149.

INDUSTRIAL APPLICABILITY

In the impacting process of the preferred embodiment the movable manipulator 32 is used to move the impacting mechanism 10 toward the surface 78 which to be impacted. The tubular actuator 14 and impact plunger 16 extend downwardly from the first end portion 24 of the guide structure 12 as shown by solid lines in FIG. 1. In this position, the first end 80 of the impact plunger 16 is spaced upwardly from the end surface 76 of the adjustable collar 67. As the impacting mechanism 10 is moved downward, the end surface 76 of the adjustable collar 67 on the tubular actuator 14 contacts the surface 78 thereby stopping its downward movement. As the guide structure 12 continues to be moved downward, the springs 124 pivot the bellcranks 110 inwardly around the pins 112 to position the rollers 118 for engagement with the collar 91 on the impact plunger 16. As the guide structure 12 and the impact plunger 16 continue to be moved downward the collar 91 contacts the rollers 118 and releasably couples the impact plunger 16 to the tubular actuator 14, thereby stopping downward movement of the impact plunger 16. The continued downward movement of the guide structure 12 relative to the impact plunger 16 and the tubular actuator 14 compresses the spring 98 between the collar 91 and the second end plate 44. Downward movement of guide structure 12 a predetermined distance relative to the tubular actuator generally illustrated by the broken lines causes the annular trip ring 147 of the releasing means 21 to engage the bellcranks 110. Continued downward movement of the guide structure 12 and annular trip ring 147 pivots the bellcranks 110 outwardly around the pins 112 against the force of the springs 124, until the rollers 118 are disengaged from the collar 91 on the impact plunger 16. When the rollers 118 disengage from the collar 91 energy of the spring 98 is released and immediately drives the impact plunger 16 downward at a high rate of speed and high force. The impact plunger 16 impacts the surface 78 within the impact area 79 of the adjustable collar 67 of the tubular actuator 14. Downward movement of the guide structure 12 is stopped by the second end plate 44 engaging and deforming the bumper 64 and contacting the stop rods 66, thus avoiding overrunning of the trip ring 147 beyond the bellcranks 110. When the impact plunger 16 breaks through the surface 78, as shown by phantom lines in FIG. 1, downward movement of the impact plunger 16 is stopped by cushioned engagement between the resilient bumper 88 and the second end plate 44 of the guide structure 12.

The impacting mechanism 10 is then raised by lifting the guide structure 12. Upward movement of the guide structure 12 also raises the impact plunger due to the engagement between the bumper 88 and the second end plate 44. The gravitational weight of the tubular actuator 14 causes it to remain in contact with the surface 78 during the initial movement of the guide structure 12 and the impact plunger 16. As the trip ring 147 becomes disengaged from the bellcranks 110 the springs 124 pivot the bellcranks 110 inwardly around the pin 112 until the rollers 118 contact the sleeve 142. Upward movement of the impact plunger 16 relative to the tubular actuator 14 causes the rollers 118 to roll on the sleeve 142 until they reach the collar 91. The springs 1 24 then pivot the bellcranks 110 further inwardly to position the rollers 118 for engagement with the collar 91. Continued upward movement of the guide structure 12 and the impact plunger 16 eventually causes the first end plate 34 to engage the resilient bumper 127 thereby also raising the tubular actuator 14 in unison with the guide structure 12 and the impact plunger 16. With the tubular actuator 14 and the impact plunger 16 coupled together the impact process is repeated to impact the surface 78 at adjacent locations.

In the impacting process of the alternate embodiment, the movable manipulator 32' is used to move the impacting mechanism 148 toward the surface 78' which is to be impacted. As the impacting mechanism 148 is moved downward, the end surface 169 of the tubular actuator 151 con&:acts the surface 78'thereby stopping its downward movement. The elastomeric ring 189 pivots the latching levers 184 inwardly around the pin 187 to position the hook portion 185 for engagement with the collar 178. As the guide structure 149 and the impact plunger 153 continue to be moved downward, the hook portions 185 of the latching levers 184 engage the collar 178 on the impact plunger 153 to releasably couple the impact plunger 153 to the tubular actuator 151, thereby stopping downward movement of the impact plunger 153. The continued downward movement of the guide structure 149 relative to the impact plunger 153 compresses the spring 98' between the collar 178 and the end plate 166. Downward movement of the guide structure 149 a predetermined distance relative to the tubular actuator 151 causes the abutment surfaces 190 of the releasing means 159 to engage the latching levers 184. Continued downward movement of the guide structure 149 pivots the latching levers 184 outwardly around the pins 186, against the force of the elastomeric ring 189, until the hook portion 185 of the latching levers 184 are disengaged from the collar 178. This releases the energy of the spring 98' and immediately drives the impact plunger 153 downward. The impact plunger 153 impacts the surface 78' within the impact area 79'of the tubular actuator 151.

The impacting mechanism 147 is then raised upward lifting the guide structure 149 and the impact plunger 153. The gravitational weight of the tubular actuator 151 causes it to remain in contact with the surface 78' during the initial movement of the guide structure 149 and the impact plunger 153. Upward movement of the impact plunger 153 relative to the tubular actuator causes the hook portion 185 to contact the collar 178. Contact between the curvilinear surface 186 of the hook portion 185 and the inclined surface 179 of the collar 178 causes the latching levers 184 to pivot outwardly against the force of the elastomeric ring 189. When the hook portion 185 is moved down past the inclined surface 179, the elastomeric ring 189 pivots the latching levers 184 inwardly around the pin 187 to engage the collar 178. With the latching levers 184 engaged with the collar 178 the impacting process is repeated to impact the surface 78' at adjacent locations.

An impacting mechanism 10 of this design disposes the impact plunger 16 in a generally centered relation within the tubular actuator. Thus, the impact plunger 16,153 impacts the surface 78,78'within the contact area of the tubular actuator 14,151. The impact is shielded and prevents fractured pieces from flying away and hitting surrounding objects. Having a plurality of circumferentially equally spaced latch assemblies 99,180 equalizes the loads on the tubular actuator and the impact plunger, thus avoiding side loads which cause bending and wear on the actuator 14 and plunger 16.

Other aspects, objects and advantages of this invention can be obtained from a study of the drawings, disclosure, and the appended claims.

We claim:

1. An impacting mechanism adapted to be mounted on a movable manipulator for movement relative to a surface to be impacted, comprising:

a guide structure adapted for being connected to the manipulator;

a tubular actuator movably supported by the guide structure and having an end surface adapted to contact the surface to be impacted;

an elongate impact plunger movably supported relative to the guide structure and the tubular actuator and being disposed in generally centered relation within the tubular actuator;

resilient means disposed between the guide structure and the elongate impact plunger for biasing the impact plunger toward the end surface of the tubular actuator;

means for releasably coupling the tubular actuator and the impact plunger together to maintain the position of the impact plunger in respect to the tubular actuator so that the resilient means is compressed in response to the guide structure being moved toward the contact end surface of the tubular actuator when the end surface of the tubular actuator is in contact with the surface to be impacted; and means for releasing the releasable coupling means when the guide structure reaches a predetermined distance from the end surface of the tubular actuator so that the resilient means drives the impact plunger toward the surface to be impacted.

2. The impacting mechanism of claim 1 wherein the impact plunger is concentrically disposed within the tubular actuator.

3. The impacting mechanism of claim 2 including a guide attached to the tubular actuator and disposed between the guide structure and the tubular actuator.

4. The impacting mechanism of claim 2 including a guide ring attached to the impact plunger and disposed between the tubular actuator and the impact plunger.

5. The impacting mechanism of claim 3 including a resilient bumper positioned on the guide.

6. The impacting mechanism of claim 1 wherein a means for adjusting the position of the end surface relative to the guide structure is attached to the end portion of the tubular actuator.

7. The impacting mechanism of claim 6 wherein the adjusting means includes an adjustable collar attached to the first end portion of the tubular actuator.

8. The impacting mechanism of claim 2 wherein the guide structure is cylindrical.

9. The impacting mechanism of claim 8 wherein the cylindrical guide structure is telescopically disposed within the tubular actuator.

10. The impacting mechanism of claim 8 where the tubular actuator is telescopically disposed within the cylindrical guide structure.

11. The impacting mechanism of claim 1 wherein the impact plunger includes a collar and the means for releasably coupling includes a latch carried by the tubular actuator and positioned to releasably engage the collar.

12. The impacting mechanism of claim 11 wherein the releasing means includes an annular trip ring mounted on the guide structure for releasing the latch when the guide structure reaches said predetermined distance from the contact end surface of the actuator.

13. The impacting mechanism of claim 11 wherein the resilient means is a spring positioned between the collar of the impact plunger and the guide structure.

14. An impacting mechanism adapted to be mounted on a movable manipulator for movement relative to a surface to be impacted, comprising:

a guide structure having a first end portion and a second end portion, and adapted for being connected to the manipulator;

a tubular actuator movably supported by the guide structure and having an end surface extending from the first end portion of the guide structure and adapted to contact the surface to be impacted;

an impact plunger movably supported by the second end portion of the guide structure and being disposed in generally centered relation within the tubular actuator, such impact plunger having an end surface adapted to inact against the surface to be impacted and a collar spaced from the end surface;

a spring positioned between the collar of the impact plunger and the second end portion of the guide structure;

means for releasably coupling the tubular actuator and the collar on the impact plunger together to maintain the position of the impact plunger with respect to the tubular actuator so that the spring is compressed if response to the guide structure being moved toward the end surface of the tubular actuator when the end surface of the tubular actuator is in contact with the surface to be impacted; and means for releasing the releasable coupling means from the collar when the guide structure reaches a predetermined distance form the end surface of the tubular actuator so that the spring drives the impact plunger toward the surface to be impacted.

15. The impacting mechanism of claim 14 wherein the impact plunger is concentrically disposed within the tubular actuator.

16. The impacting mechanism of claim 15 including a guide attached to the second end portion of the tubular actuator and disposed between the guide structure and the tubular actuator.

17. The impacting mechanism of claim 15 including a guide ring attached to the impact plunger and disposed between the tubular actuator and the impact plunger.

18. The impacting mechanism of claim 14 wherein the impact plunger impacts the surface within the tubular actuator.

19. An impacting mechanism adapted to the mounted on a movable manipulator for movement relative to a surface to be impacted, said impacting mechanism comprising a guide structure, a tubular actuator supported by the guide structure for coaxial movement relative to the guide structure and adapted to contact the surface to be impacted, an impact plunger disposed in generally centered relation within the tubular actuator for coaxial movement relative to the guide structure and the tubular actuator and having an end surface adapted to contact the surface to be impacted, a spring positioned between the impact plunger and the guide structure and adapted to bias the impact plunger toward the surface to be impacted, a latch carried by the tubular actuator and positioned to releasably engage the impact plunger with the tubular actuator to maintain the position of the impact plunger with respect to the tubular actuator so that the spring is compressed in response to the guide structure being moved toward the surface to be impacted when the end surface of the tubular actuator is in contact with the surface to be impacted, and means for releasing the latch from the impact plunger when the guide structure reaches a predetermined distance from the surface to be impacted so that the spring drives the impact plunger toward the surface to be impacted.

20. An impacting mechanism adapted to be mounted on a movable manipulator for movement relative to a surface to be impacted, comprising:

a guide structure adapted for being connected to the manipulator;

a tubular actuator movably supported by the guide structure and having an end surface adapted to contact the surface to be impacted;

an impact plunger movably supported relative to the guide structure and being disposed in generally centered relation within the tubular actuator, said impact plunger having an end surface adapted to impact the surface to be impacted;

resilient means disposed between the guide structure and the impact plunger for biasing the impact plunger toward the surface to be impacted;

means for releasably coupling the tubular actuator and the impact plunger together to maintain the position of the impact plunger in respect to the tubular actuator so that the resilient means is compressed in response to the guide structure being moved toward the surface to be impacted when the end surface of the tubular actuator is in contact with the surface to be impacted;

means for releasing the releasable coupling means from the impact plunger when the guide structure reaches a predetermined distance from the surface to be impacted so that the resilient means drives the impact plunger toward the surface to be impacted; and wherein the end surface of the tubular actuator encloses the area of impact between the end surface of the impact plunger and the surface to be impacted.

21. An impacting mechanism adapted to the mounted on a movable manipulator for movement relative to a surface to be impacted, comprising a guide structure adapted for being connected to the manipulator;

a tubular actuator movably supported by the guide structure and having an end surface adapted to contact the surface to be impacted;

an impact plunger movably supported relative to the guide structure and the tubular actuator and being disposed in generally centered relation within the tubular actuator;

a spring disposed between the guide structure and the impact plunger for biasing the impact plunger toward the end surface of the tubular actuator;

a collar assembly connected to the impact plunger;

a plurality of latch assemblies attached to the tubular actuator, each of said latch assemblies including a roller positioned for engagement with the collar assembly; and means for releasing the latch assemblies from the collar assembly when the guide structure reaches a predetermined distance from the end surface of the tubular actuator so that the spring drives the impact plunger toward the surface to be impacted.

22. The impacting mechanism of claim 21 wherein each of the latch assemblies includes a mounting assembly attached to the tubular actuator.

23. The impacting mechanism of claim 22 wherein each of the latch assemblies includes a bellcrank pivotally attached to the mounting assembly.

24. The impacting mechanism of claim 23 wherein the bellcrank includes a bifurcated end portion, said roller being positioned within the bifurcated end portion.

25. The impacting mechanism of claim 21 wherein the releasing means includes a trip ring attached to the guide structure and positioned for engaging the latch assemblies and pivoting the bellcranks out of engagement with the collar assembly.

* * * * *

UNITED STATES PATENT AND TRADEMARK OFFICE
CERTIFICATE OF CORRECTION

PATENT NO. : 4,852,662

DATED : August 1, 1989

INVENTOR(S) : Raymond A. Bianchi et al.

It is certified that error appears in the above-identified patent and that said Letters Patent is hereby corrected as shown below:

Claim 14, line 25 (column 8, line 13): delete "if" and insert --in--.

Claim 19, line 1 (column 8, line 35): delete "the" and insert --be--.

Claim 21, line 1 (column 9, line 27): delete "the" and insert --be--.

Signed and Sealed this

Fifteenth Day of May, 1990

*Attest:*

HARRY F. MANBECK, JR.

*Attesting Officer* *Commissioner of Patents and Trademarks*